March 6, 1945.  M. L. WARNER  2,371,084
AUTOMATIC TOASTING APPARATUS
Filed Feb 7, 1941  7 Sheets-Sheet 1

INVENTOR
Maurice L. Warner,
BY Harry B. Rook,
ATTORNEY

March 6, 1945.　　　M. L. WARNER　　　2,371,084
AUTOMATIC TOASTING APPARATUS
Filed Feb. 7, 1941　　　7 Sheets-Sheet 3

INVENTOR
Maurice L. Warner,
BY Harry B. Rook.
ATTORNEY

March 6, 1945. M. L. WARNER 2,371,084
AUTOMATIC TOASTING APPARATUS
Filed Feb. 7, 1941 7 Sheets-Sheet 4

INVENTOR
Maurice L. Warner,
BY
Harry B. Rook,
ATTORNEY

March 6, 1945.     M. L. WARNER     2,371,084
AUTOMATIC TOASTING APPARATUS Filed Feb. 7, 1941     7 Sheets—Sheet 5

INVENTOR
Maurice L. Warner,
BY
Harry B. Rook,
ATTORNEY

March 6, 1945.  M. L. WARNER  2,371,084
AUTOMATIC TOASTING APPARATUS
Filed Feb. 7, 1941  7 Sheets-Sheet 6

INVENTOR
Maurice L. Warner,
BY Harry B. Rook,
ATTORNEY

Patented Mar. 6, 1945

2,371,084

UNITED STATES PATENT OFFICE 2,371,084

AUTOMATIC TOASTING APPARATUS

Maurice L. Warner, Jersey City, N. J., assignor, by mesne assignments, to Savory Equipment, Inc., Newark, N. J., a corporation of New Jersey Application February 7, 1941, Serial No. 377,852

14 Claims. (Cl. 99—328)

This invention relates in general to cooking apparatus or the like and heaters therefor, and more particularly to apparatus for toasting slices of bread or the like, which includes a heating means, a toasting chamber and timing mechanism under control of a thermostatic device responsive to temperature conditions within the apparatus for controlling the toasting or cooking operation. While the invention especially contemplates a gas-heated toaster, it may be embodied in apparatus including other types of heaters, for example electric heaters.

In a certain type of apparatus of this character, the duration of the toasting interval, i. e., the period during which the bread slice or the like is subjected to the heat of the heating means, is determined by the temperature in the toasting chamber at the instant the interval begins, while in other types of apparatus, the duration of the heating interval is determined by the temperature at the end of the interval or by the temperature conditions that prevail throughout the interval, respectively.

Toasters of these types do not produce efficiently uniform toasting of successive slices, especially where the amounts of moisture vary in the different slices or where the successive slices differ in texture or composition so that one slice will toast more rapidly than another under the same toasting conditions in the apparatus.

Therefore, certain objects of my invention are to provide apparatus of the character described which shall include novel and improved features of construction whereby to produce efficient and uniform toasting successively of slices of bread or the like even though said slices may differ substantially in moisture content or texture or composition; and thus to provide novel and improved mechanism whereby the toasting interval shall comprise two increments or periods, namely, a first period beginning with the instant the heating means is started in operation or the slice is subjected to the heat of the heating means and continuing for a predetermined time regardless of temperature conditions in the toasting chamber, and a second period beginning at the end and in continuation of the first period and the duration of which is predetermined and set in accordance with the temperature in the toasting chamber at the end of the first period, so that during the first period the slice shall be subjected to the heat to drive off the desired amount of moisture content and to preheat the slice and during the second period the slice shall be subjected to the heat for a definite time determined by the temperature at the end of the first period to complete the toasting operation, for example, to brown the slice to the desired degree.

Another object is to provide apparatus of this character that shall include a novel and improved construction and combination of a radiant heater, means for starting operation of the heater or the toasting of the slice, timing mechanism, means controlled by said timing mechanism for stopping operation of the heater or terminating the toasting, and thermostatic means subject to the radiant heat from the heater and cooperating with said timing mechanism to permit operation of the heater or preheating of the slice for a certain period of time after the beginning of the toasting interval, and then to set the timing mechanism to predetermine the duration of the remainder or a second period of the toasting interval in accordance with the radiant temperature of the heater at the end of the first period.

Another object is to provide in such apparatus a novel and improved combination and arrangement of a heater, a thermostatic element for controlling a timing mechanism for the heater and a slice carrying mechanism, a radiant to be directly heated by the heater for radiating heat to a slice to be toasted, and a heat-conducting baffle directly connected to said radiant and partially surrounding said thermostatic element so that said element shall be responsive to, and the setting of the timing mechanism for the said second period of the toasting interval shall be determined by, the temperature of the radiant rather than the temperature within the toasting chamber, whereby to compensate for the cooling of the toasting chamber by the moisture driven from the slice during the first period of the toasting interval.

A further object is to provide a toasting apparatus that shall include novel and improved construction and combination of a slice carrying mechanism to be manually operated for moving slices to be toasted into toasting position, means for normally actuating said mechanism into non-toasting position, and timing mechanism automatically operable to actuate said holding means after a toasting interval to permit movement of said slice-carrying mechanism into non-toasting position.

Another object is to provide in toasting apparatus of this character a novel and improved construction and combination of a slice carrier and actuating means for a heater control device, which shall include a single lever for actuating the slice carrier into toasting position and simultaneously actuating said control device to start operation of the heater, and means for causing actuation of said slice carrier into non-toasting position and simultaneous actuation of said control device to stop the heater.

Other objects are to provide for a gas-heated toasting apparatus or the like, a novel and improved, efficient, simple and inexpensive radiant to be directly heated by flame from a gas heater and to radiate heat to a slice or the like to be toasted, cooked or heated; and to obtain other advantages and results that will be brought out by the following description in conjunction with the accompanying drawings in which.

For the purpose of illustrating the principles of the invention, I have shown the invention embodied in a gas heated toasting apparatus of the vertical type which includes a casing A within which is arranged a support frame B. The support frame includes a front wall 1, a rear wall 2 and end walls 3, that are disposed in spaced relation to the respective front and rear and end walls 4, 5 and 6 of the casing. The casing also preferably has a top wall 7 and a bottom wall 8 whereby the operating parts of the apparatus are fully enclosed.

Mounted on the end walls 3 of the frame B at the rear of the frame, is a gas heater that comprises a manifold 9 having three burner tubes 10 projecting forwardly therefrom in approximately horizontal and parallel relation to each other. Gas is supplied to the burner through a supply pipe 11, a spring-closed reciprocating control valve 12 of known construction and the usual fuel mixer 13, and each burner tube 10 has a longitudinal row of outlet or flame jet openings 14.

Between the middle burner tube and the two end burner tubes are toasting chambers C the side walls of which are formed by radiants D, while the end walls are formed by the front and rear walls 1 and 2 of the frame B. The chambers have open top ends in register with openings 7a in the top wall 7 of the casing.

As shown, each radiant comprises a base including end pieces 15 connected by side pieces 16, the end pieces being adapted to rest upon and straddle the corresponding burner tube 10. Preferably the burner tube has notches 17 in which the end pieces 15 are seated. Mounted on the base of the radiant are two frames 18 that project upwardly in spaced converging relation to each other, each frame being formed of side pieces 19 and end pieces 20, each having two angularly disposed flanges. A sheet 21 of wire gauze is secured to the side and end pieces of each frame, and a plurality of reenforcing strips 22 of metal are secured to each sheet, each strip having two angularly disposed flanges one of which is secured to the corresponding sheet 21 while the other projects angularly from the plane of the sheet. The upper end pieces 20 of the frames 18 of each radiant are slidably fitted into a channel 23 that is secured to a flat strip 24 which is set between the edges of the front and rear walls 1 and 2 of the frame B and the edges of spacers 25 that are secured to said end walls. With this construction, the radiants are easily removable from the frame B and may be firmly supported in operative position.

It will be observed that when the radiants are mounted on the burner tubes 10, one sheet 21 of fine mesh wire gauze will be interposed between the flame jets of the corresponding burner tube and the corresponding toasting chamber C, so that the sheets of gauze will be heated to incandescence by the flames from the burner tube, but said flames will be prevented from passing through the gauze into the toasting chamber.

Preferably suitable means such as guide wires 26 are fitted in openings in the side pieces 16 of each radiant and the corresponding top strips 24 so as to prevent direct contact of a slice of bread or the like with the wire gauze of the radiants.

Figure 5:
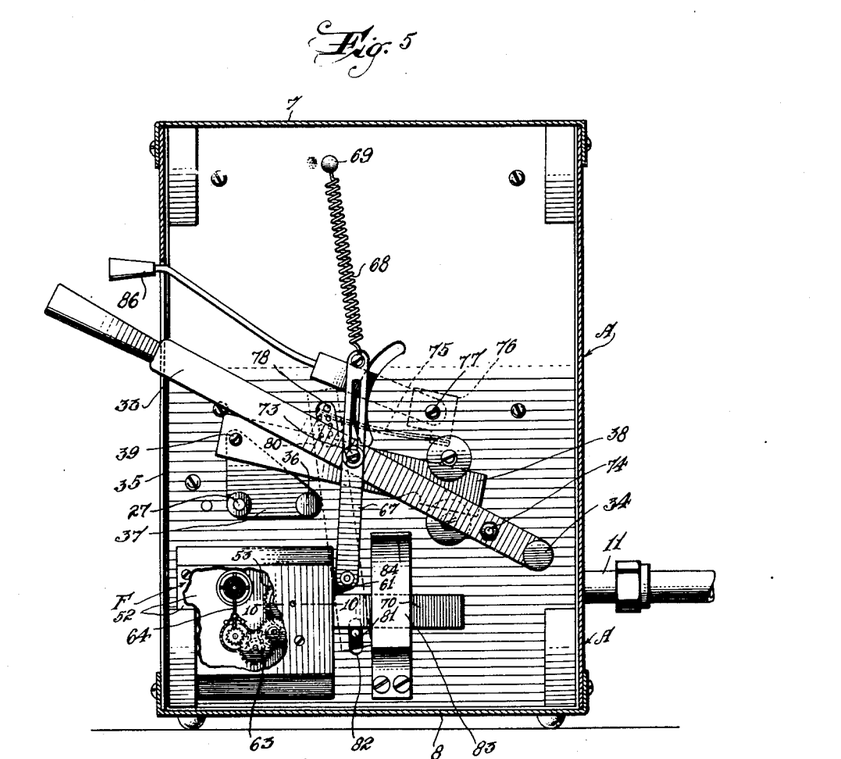
Figure 5 is a transverse vertical sectional view on the line 5—5 of Figure 1 showing the parts in non-toasting position.
Figure 6:
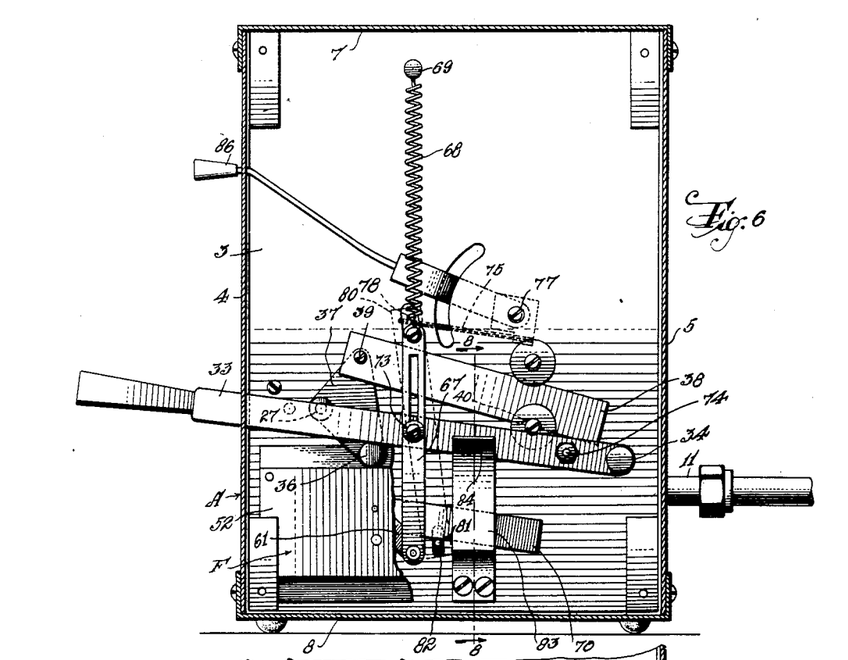
Figure 6 is a similar view showing the parts in position at the beginning of a toasting operation.

A slice-carrying mechanism is provided for moving a slice into and out of each toasting chamber, and comprises a shaft 27 rotatably mounted in the end walls 3 of the frame at the front thereof and a laterally projecting slice-carrying arm 28 for each toasting chamber that is swingable about the axis of the shaft up and down in said chamber. The shaft 27 is normally influenced to swing the slice-carrying arms upwardly in the toasting chambers, by tension springs 42 and 30. The spring 30 has one end connected to one end of an arm 31 secured to the shaft, and its other end connected to a fixed support, i. e., one end wall 3 of the frame as at 32. The slice-carrying mechanism is actuated in the other direction to lower a slice of bread into the toasting chamber by a manually operated lever 33 that is pivotally connected at one end as at 34 to one end wall of the frame B with its other end projecting outwardly through a slot 35 in the front wall of the casing A. This lever cooperates with a stud 36 on a bell crank 37 that is connected to the end of the shaft 27 on the outer side of said end wall 3 of the frame. Normally the bell crank 37 is influenced by the spring 30 into the position shown in Figure 5, and when it is desired to actuate the slice-carrying mechanism to lower a slice of bread into toasting position, the lever 33 is manually depressed into engagement with the stud 36 so as to swing the bell crank as shown in Figure 6.

Figure 1:
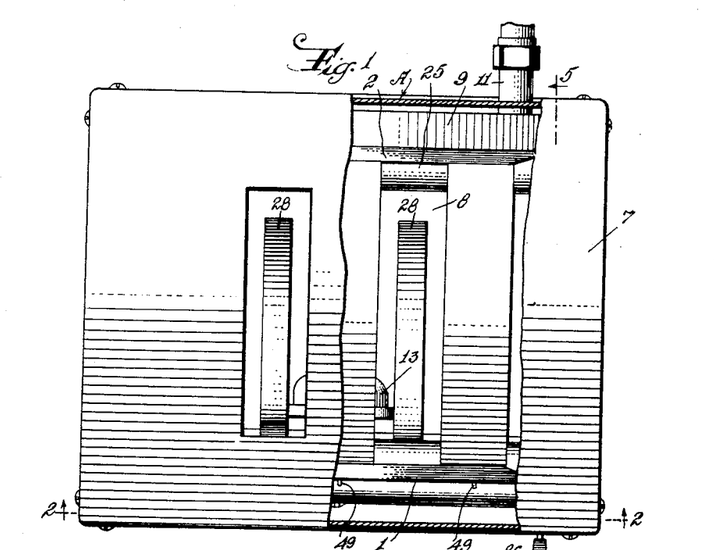
Figure 1 is a top plan view of a toasting apparatus embodying my invention.
Figures 2, 4, 4A:
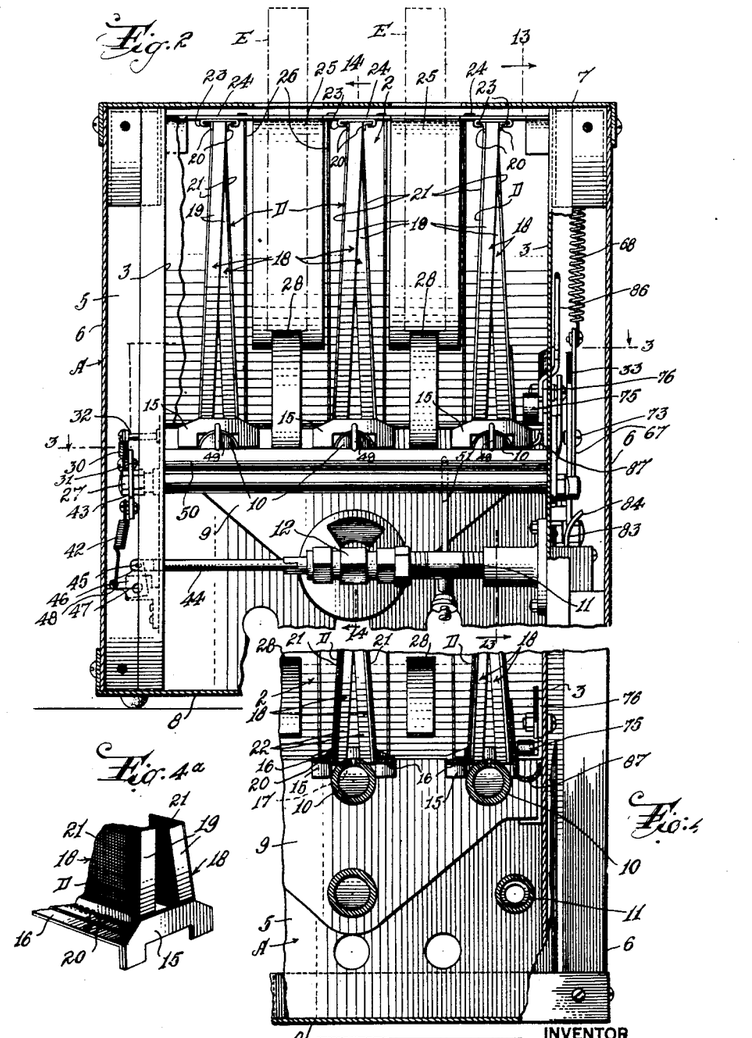
Figure 2 is a vertical longitudinal sectional view taken on the line 2—2 of Figure 1 with portions broken away for clearness in illustration.
Figure 4 is a fragmentary vertical longitudinal sectional view on the line 4—4 of Figure 3.
Figure 4A is a fragmentary perspective view of one of the radiants of the heater.
Figure 3:
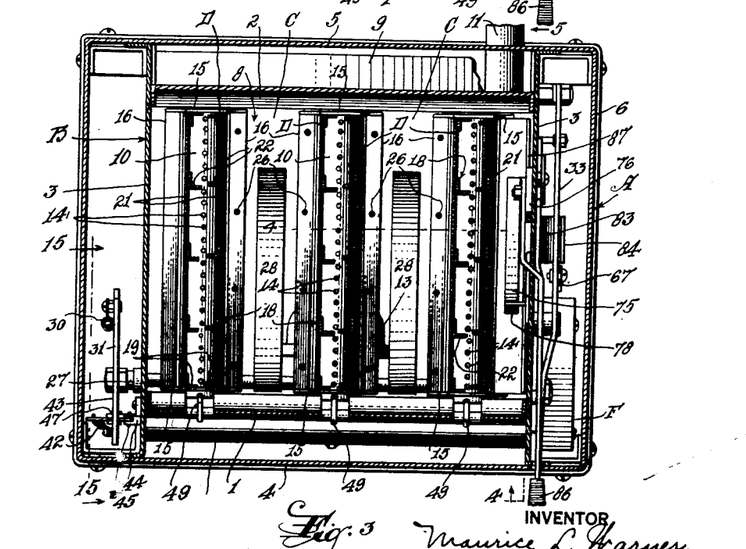
Figure 3 is a horizontal sectional view on the line 3—3 of Figure 2.
Figure 7:
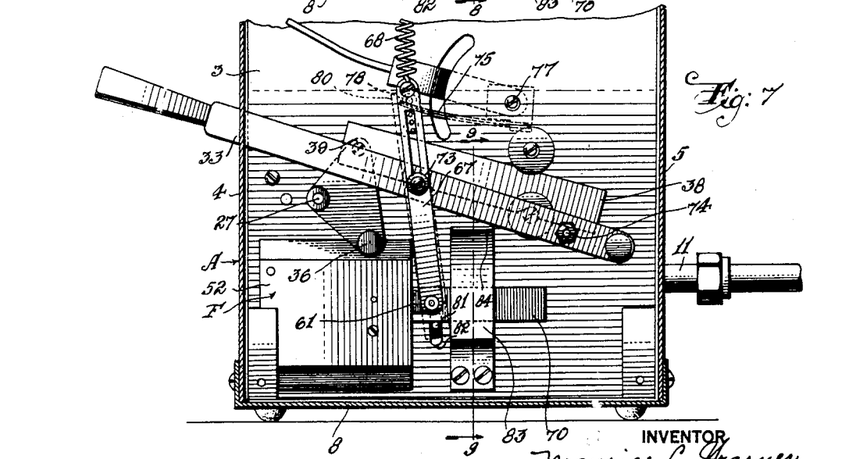
Figure 7 is a similar view of the parts in the positions assumed just prior to the termination of a toasting operation.
Figure 12:
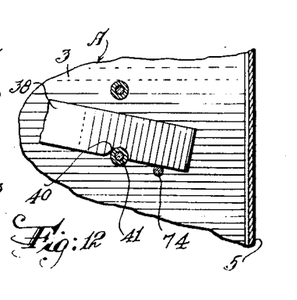
Figure 12 is a fragmentary side elevational view of the detent for holding the slice-carrying mechanism in position to locate a slice in the toasting chamber and for holding the heater control device in position to maintain operation of the heater.
Figure 13:
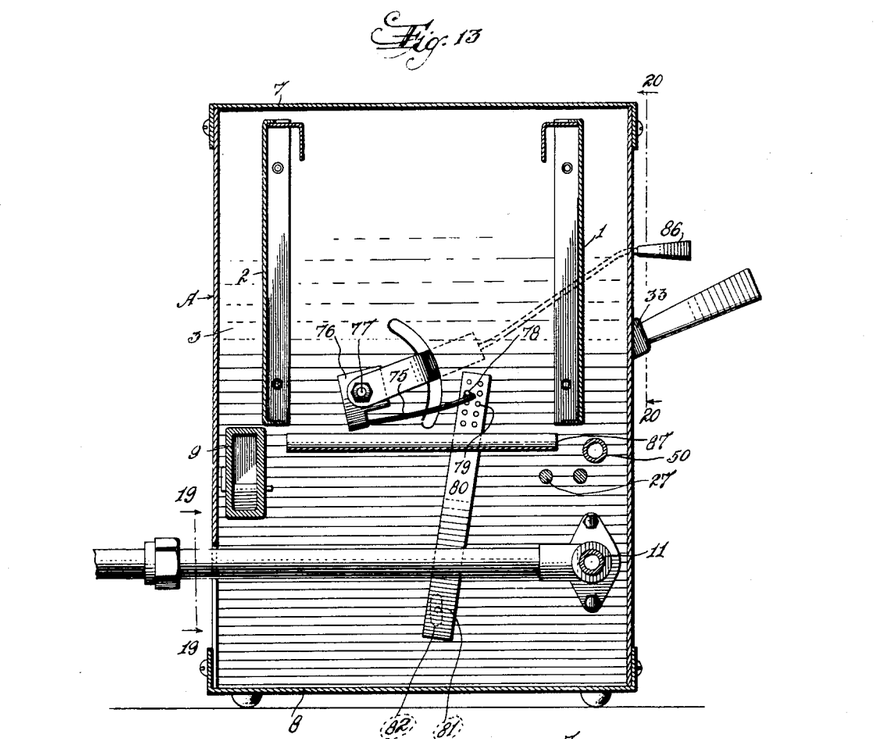
Figure 13 is a transverse vertical sectional view on the line 13—13 of Figure 2.
Figure 14:
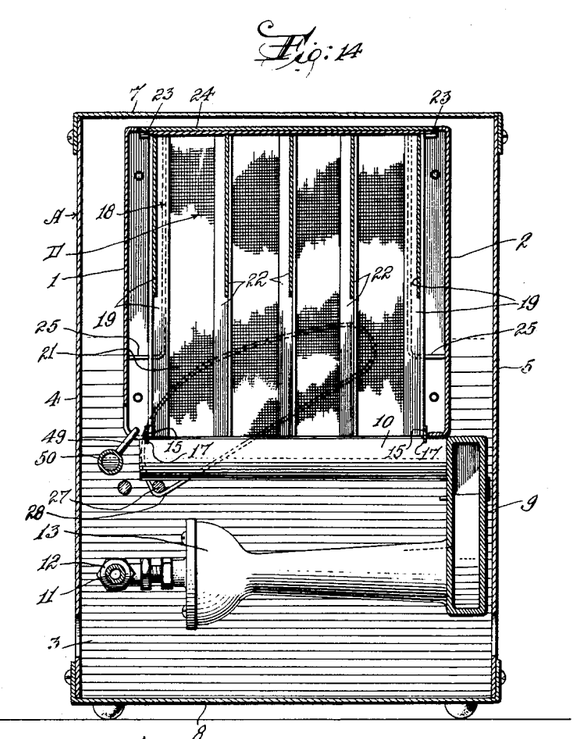
Figure 14 is a similar view on the line 14—14 of Figure 2.
Figures 15, 16, 17, 18:
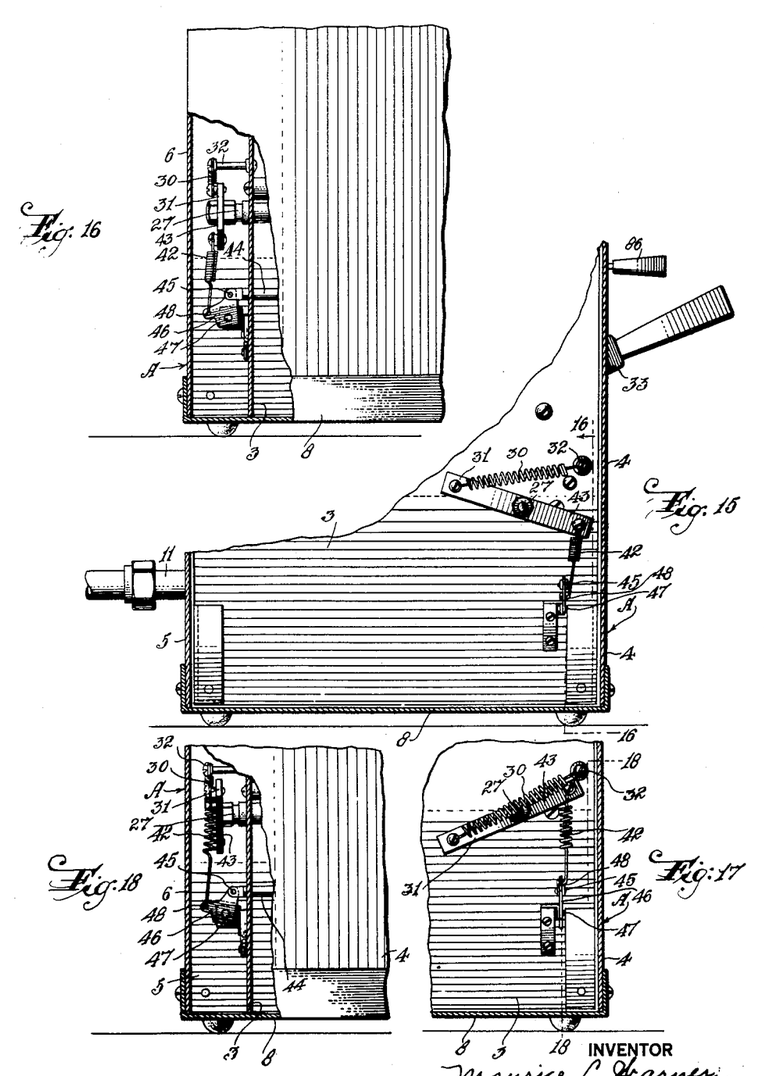
Figure 15 is a fragmentary transverse vertical sectional view on the line 15—15 of Figure 3 showing the parts in non-toasting position.
Figure 16 is a vertical sectional view on the line 16—16 of Figure 15.
Figure 17 is a view similar to Figure 15 showing the parts in toasting position.
Figure 18 is a view similar to Figure 16 on the line 18—18 of Figure 17.
Figures 19, 20:
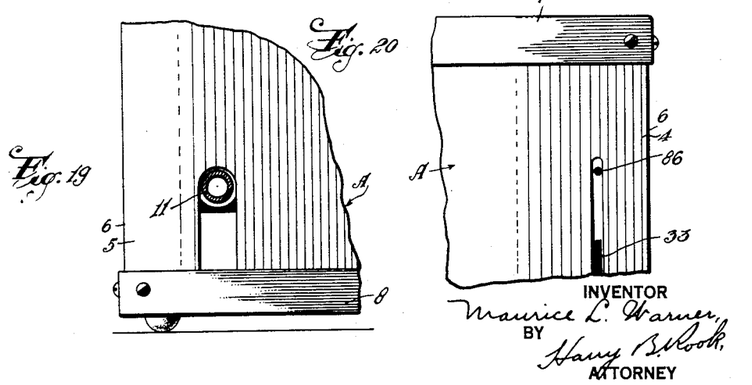
Figure 19 is a fragmentary rear elevational view from the line 19—19 of Figure 13.
Figure 20 is a fragmentary front elevational view from the line 20—20 of Figure 13.

For holding the slice-carrying arms to locate a slice in toasting position, I provide a detent 38 that comprises a strip of metal having one end pivotally connected at 39 to the bell crank 37 and having a notch 40 in its lower edge to cooperate with a stud 41 on the outer side of the end wall of the frame. When the slice-carrying mechanism is in normal non-toasting position, the notch 40 is disengaged from the stud 41 as shown in Figure 5, but when the slice-carrying mechanism is actuated into toasting position, the notch 40 engages the stud 41 as shown in Figures 6, 7 and 12 to hold the slice-carrying mechanism in toasting position. The spring 30 is of such strength that when it is energized it will be capable of lifting the slice-carrying arms and the slices thereon upwardly in the toasting chambers as shown in Figure 2 where the dot and dash lines E represent slices of bread; but the spring acts secondarily to the spring 42 and is so related to the arm 31 and the axis of the shaft 27 that the spring will be in approximately dead-center relation to said arm and said axis when the slice-carrying mechanism is in toasting position as shown in Figure 17.

The spring 42 serves both to actuate the slice-carrying mechanism and as a yielding element in a connection for operating the heater control valve 12 simultaneously with the slice-carrying mechanism so as to start and stop the heater simultaneously with movement of the slice-carrying mechanism into toasting and non-toasting positions, respectively. For this purpose the spring 42 has one end connected to an arm 43 projecting from the shaft 27 oppositely to the arm 31, while the other end is connected at 48 to a small bell-crank 46 that is pivotally connected at 47 on one end wall of the frame B adjacent the arm 43 and is also pivotally connected at 45 to a push rod 44 for the valve 12, so that said spring will be energized when the slice-carrying mechanism is actuated to move a slice into the toasting chamber and will exert a pull on the shaft 27 to swing the slice-carrying mechanism toward non-toasting position initially upon release of the detent 38 from the stud 41. The tension of the spring 42 is such that the spring ceases its influence on the slice-carrying mechanism before the latter reaches the end of its slice-ejecting movement, whereupon the spring 30 completes said movement.

The valve 12 is of the known reciprocating type, being spring closed, and opened by pressure upon the push rod 44. With this construction, the valve push rod 44 will be pushed to open the valve as the slice-carrying mechanism is moved to toasting position, as shown in Figures 17 and 18, while the push rod will be released for closing of the valve by its spring as the slice-carrying mechanism is moved to non-toasting position, as shown in Figures 15 and 16.

It will be understood that the burners will be automatically lighted as by constantly burning jets from pilot burners 49 that form branches of a manifold 50 which is connected with the gas supply pipe by a tube 51 between the supply and the valve 12.

Figure 10:
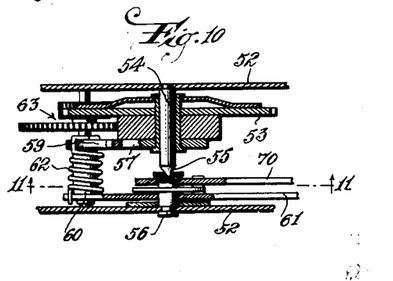
Figure 10 is a fragmentary horizontal sectional view on an enlarged scale taken on the line 10—10 of Figure 5.
Figure 11:
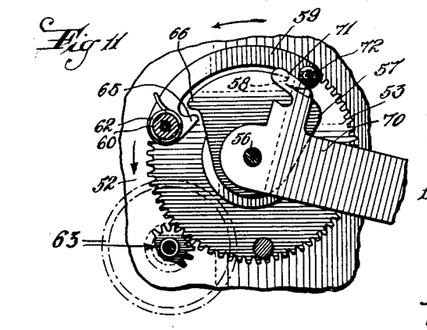
Figure 11 is a vertical sectional view on the line 11—11 of Figure 10.

The duration of the toasting interval, i. e., the interval during which the slice to be toasted is subjected to heat from the heater, is controlled by a timing mechanism generally designated F (see Figures 5, 10 and 11). This timing mechanism includes a frame or casing 52 in which is journaled a gear 53 on a shaft section 54 one end of which is connected to the frame 52 while the other end has a bearing 55 in another shaft section 56 that is also connected to the frame 52. The gear 53 is held in tight frictional driving contact with a driving segment 57 that has a shoulder 58 to cooperate with a driving dog 59 that is pivotally connected on a stud 60 carried by one end of a driving lever 61 that is pivotally mounted intermediate its ends on the shaft section 56. The driving dog 59 is normally influenced into engagement with the driving segment 57 by a spring 62. With this construction, when upward tension is applied to the driving lever 61 and the dog 59 engages the shoulder 58, the gear wheel 53 will be driven in the direction of the arrow in Figure 11. The gear 53 is connected through a gear train generally designated 63, to an escapement mechanism 64, whereby the speed of rotation of the gear 53 is controlled. After the gear has been moved to a certain limit in said direction under influence of the lever 61, the relationship of the driving segment to the gear may be changed, for example to return the driving segment to its initial position, by manually moving the lever 61 in the direction opposite to that of its normal motion, i. e., downwardly in Figure 11, to cause engagement of a tooth 65 on the tail of the dog 59 with a shoulder 66 on the driving segment 57, and then manually forcing the lever 61 in the same direction to cause frictional slipping of the driving segment 57 relatively to the gear 53 which is held against movement by the gear train 63 and the escapement mechanism.

In accordance with the invention, the driving lever 61 is connected to one end of a driving link 67 the other end of which is connected to one end of a tension spring 68 the other end of which is connected at 69 to the adjacent end wall 3 of the frame B, so that the spring 68 will normally exert an upward pull on the lever 61 to drive the timing mechanism.

Operation of the timing mechanism under the influence of the spring 68 is stopped by a setting member or tripper 70 pivotally mounted on the shaft section 56 and having a cam surface 71 to cooperate with a roller 72 on the driving dog 59 for disengaging the driving dog from the driving segment 57 at a predetermined point. The tripper 70 may be adjusted about the shaft section 56 and then set to locate the cam surface 71 in a certain relation to the path of movement of the roller 72, so that after the gear 53 has moved a certain distance under the influence of the driving lever 61, the roller 72 will ride upwardly on the cam surface 71 so as to disengage the dog 59 from the shoulder 58 of the driving segment 57 and stop operation of the timing mechanism.

For moving the lever 61 to start the timing mechanism, as well as for causing movement of the slice-carrying mechanism into non-toasting position and for stopping operation of the gas heater in accordance with the stopping of the timing mechanism, the operating lever 33 has a pin and slot connection 73 with the driving link 67, and the lever has a stud 74 to cooperate with the detent 38.

In starting the toasting operation, as the lever 33 is pressed downwardly, it moves the driving lever 61 downward to cause engagement of the dog 59 with the driving segment, and as the lever 33 is released, the spring 68 starts the timing mechanism. At the same time the slice-carrying mechanism is actuated to toasting position and the heater is started.

At the beginning of the toasting interval, i. e., when the slice-carrying mechanism has been manually actuated into toasting position, the lever 33 will be in the position shown in Figure 6, and the detent 38 will overlie the stud 74 on the lever 33. During operation of the timing mechanism under the influence of the spring 68, the lever 33 will be raised gradually upwardly by said spring 68 under the control of the timing mechanism until the dog 59 is disengaged from the driving cam 57 by the tripper 70. Thereupon, due to release of the driving lever 61, the spring 68 will move the lever 33 upwardly with a snap action so as to cause engagement of the stud 74 with the detent 38 and instantaneous release of the detent from the stud 41. The springs 30 and 42 will then automatically swing the slice-carrying mechanism into non-toasting position and stop operation of the heater.

Another feature of my invention is the provision of a thermostatic mechanism to cooperate with the timing mechanism to set the latter after a predetermined initial period of the toasting interval to determine the duration of the subsequent period of said interval. As shown, the setting of the tripper 70 is controlled by a thermostatic mechanism that includes a bimetallic thermostatic element 75 which is mounted at one end on a bracket 76 that is pivotally connected at 77 on the inside of the corresponding end wall 3 of the frame B. The free end of the thermostatic element has a laterally projecting pin 78 secured thereto and inserted into one of a plurality of openings 79 in a link 80 that also has a pin 81 projecting through a slot 82 in the end wall of the frame and underlying the tripper 70. The thermostatic element 75 is located between one of the radiants and the next adjacent end wall of the frame B so as to be responsive to radiant heat from the corresponding burner tube and radiant. As the temperature increases and decreases the thermostatic element 75 is flexed upwardly and downwardly so as to raise the tripper 70 or permit lowering thereof by gravity, respectively.

Figure 8:
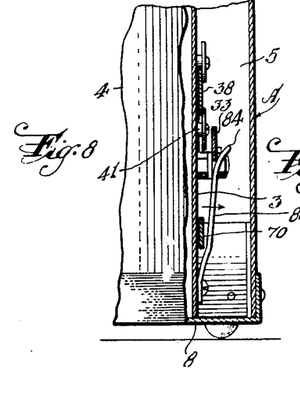
Figure 8 is a fragmentary vertical sectional view on the line 8—8 of Figure 6.
Figure 9:
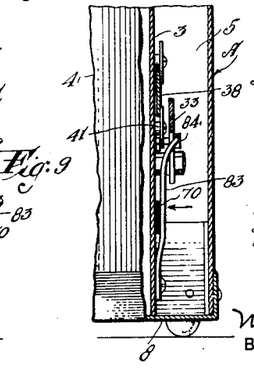
Figure 9 is a similar view on the line 9—9 of Figure 7.

Cooperating with the tripper is a detent 83 that is shown in the form of a spring strip having one end secured to the end wall of the frame and its other end receiving the tripper 70 between itself and said end wall. The free upper end of the detent strip has an outwardly beveled cam surface 84 to be engaged by the operating lever 33 as the latter is manually pushed downwardly to start operation of a toasting interval (see Figures 6 and 8), so that the tripper will be released by the detent strip for control by the thermostatic element 75. The tripper will remain unset or free for movement under the influence of a thermostatic element during a certain period of time after the beginning of the toasting interval, this period being determined by the disengagement of the lever 33 and the detent strip 83 as the lever is moved upwardly under control of the timing mechanism. During this initial period, the temperature acting upon the thermostatic element will have reached a certain degree, and as the detent 83 is released by the lever 33, the tripper will be engaged by the detent and held or set against further movement, as shown in Figures 7 and 9. The timing mechanism will then continue to operate for another period that is predetermined by the setting of the tripper in accordance with the temperature acting upon the thermostatic element at the end of the first period.

In accordance with the invention, the thermostatic element 75 is located outside of the toasting chamber, and is underlaid and partially surrounded by a heat-conducting baffle 87 of metal that is directly connected to the adjacent radiant D between the burner and the thermostatic element. The thermostatic element thus is protected from direct contact with convection currents of cool air rising upwardly through the casing and is heated and cooled in accordance with the heating and cooling of the radiant and baffle. During the initial period of the toasting interval, the moisture driven out of the slice will retard heating of the radiant, but the ambient temperature in the toasting chamber will be substantially less than the temperature of the radiant. It is the temperature of the radiant rather than the ambient temperature in the toasting chamber that eventually determines the degree of toasting or browning of the slice, and my invention compensates for the temperature difference so as to ensure efficient and uniform toasting of successive slices.

It will be understood by those skilled in the art that the duration of the first period may be varied by changing the relationship of the lever 33 to the cam surface 84 of the detent.

It is also desirable that the thermostatic element 75 be adjustable to accommodate different temperature ranges, and for this purpose the bracket 73 is pivotally mounted and may have an extension 85 projecting through the slot 35 in the front wall of the casing and provided with a finger piece 86 for rotating the bracket. Also, the tripper may be adjusted relatively to the thermostatic element by inserting the pin 78 into different ones of the holes 79.

My apparatus makes it possible to produce efficient and uniform toasting of slices of bread or the like even though the slices may differ substantially in moisture content or texture or composition. The first period of the toasting interval allowing for evaporation of moisture from the slices or for preheating of the slices without regard to the temperature in the toasting chamber, and the second period of the interval providing for a completion of the toasting operation, for example browning of the slice to the desired degree, this second period being determined in accordance with the temperature at the end of the first period.

Many modifications and changes in the details of structure of the apparatus will occur to those skilled in the art as within the spirit or scope of the invention, and obviously the invention may be embodied in different types of apparatus and in conjunction with other heaters than gas heaters.

Having thus described my invention, what I claim is:

1. Apparatus of the class described comprising a toasting chamber, a constant speed timing device operable independent of the temperature in the toasting chamber for an initial period of the toasting interval, means for starting a toasting interval and said timing mechanism, movable means associated with said timing device and arranged for free movement for an initial period of the toasting interval of a predetermined duration, means for arresting movement of said last mentioned means after said initial period, and means responsive to the temperature in said toasting chamber for setting said movable means and said timing device for the remainder of the toasting interval in accordance with the temperature variations during the initial period.

2. Apparatus of the class described comprising a toasting chamber, a constant speed timing mechanism operable independent of the temperature in the toasting chamber for an initial period of the toasting interval, means for starting a toasting interval and said timing mechanism, means cooperating with and responsive to said starting means and controlled by said timing mechanism for terminating an initial period of the toasting interval of a predetermined duration, thermostatic means controlled by the temperature variations in the toasting chamber during the initial period, and means associated with said timing mechanism controlled by said thermostatic means for setting said timing mechanism in accordance with the temperature variations during the initial period for the remainder of the toasting interval.

3. Apparatus of the class described comprising a toasting chamber, a constant speed timing device operable independent of the temperature in the toasting chamber for an initial period of the toasting interval, means for starting a toasting interval and said timing device, means responsive to said timing device for terminating an initial period of the toasting interval of a predetermined duration, and means controlled by the temperature in said toasting chamber for determining the duration of the remainder of the toasting interval and for resetting said timing device in accordance with the temperature variations during said initial period.

4. Apparatus of the character described comprising a toasting chamber, a heater therefor and a heater control device, means for actuating said heater control device to start and stop the heater including a lever manually movable in the direction to start the heater, spring mechanism for moving said means automatically in the other direction, said lever being movable in the other direction independently of said means, a detent cooperating with said actuating means to maintain the heater in operation, a spring for moving said lever in said other direction, a timing mechanism for retarding movement of said lever in the second-mentioned direction against the influence of said spring including setting means to release the lever for free actuation by the spring after a predetermined time interval, and means carried by said lever to engage and release said detent upon movement of said lever under influence of said spring after release of said lever by said timing mechanism, thereby to stop operation of said heater.

5. Apparatus of the character described comprising a toasting chamber and a heater therefor, means for moving a slice into and out of said chamber including a lever movable manually in the direction for actuating said means to move a slice into the chamber, a spring mechanism for actuating said means in the direction to move said slice out of said chamber, a detent cooperating with said means to maintain the latter in position to hold said slice in said chamber, said lever being movable in the other direction independently of said means, a spring for moving said lever in the second-mentioned direction, a timing mechanism for retarding movement of said lever in the second-mentioned direction against the influence of said spring including setting means to release the lever for actuation by said spring after a predetermined time interval, and means carried by said lever to actuate and release said detent upon movement of said lever under influence of said spring after release of said lever by said timing mechanism, thereby to move said slice out of said toasting chamber.

6. Apparatus of the character described comprising a toasting chamber, a timing mechanism including a movable setting member and means for normally holding said setting member stationary, means for starting a toasting interval and said timing mechanism simultaneously including a device cooperating with said holding means for said setting member to permit free movement of said member for an initial period of said toasting interval of predetermined duration and to prevent further movement of said setting member and thereby set said timing mechanism to fix the duration of the remainder of the toasting interval, and thermostatic mechanism cooperating with said setting member to move the latter in accordance with temperature variations during said initial period.

7. Apparatus of the character described comprising a toasting chamber and a heater therefor, means for moving a slice into said chamber to start a toasting interval, a constant speed timing mechanism, means cooperating with the first-mentioned means and controlled by said timing mechanism for moving said slice out of said chamber to terminate said toasting interval, and thermostatic mechanism cooperating with said timing mechanism to set the latter after an initial period of said toasting interval of predetermined duration to determine the duration of the subsequent period of said toasting interval, said means for starting the toasting interval including an operator manually movable in one direction to start the interval and automatically movable in the other direction under control of said timing mechanism, and said timing mechanism including a tripper to cause operation of said means for terminating the toasting interval, and there being an operative connection between said tripper and said thermostatic mechanism whereby the latter will set the former, and a detent cooperating with said tripper and normally influenced to hold said tripper against movement, said detent being formed to cooperate with said operator so that the detent is actuated by said operator as the latter is moved to start the interval so as to release and permit free movement of the tripper for a period after the beginning of the toasting interval and to hold the tripper against movement during the remainder of the toasting interval.

8. Apparatus of the character described comprising a toasting chamber and a heater therefor, means for starting said heater to begin a toasting interval, a constant speed timing mechanism, means cooperating with the first-mentioned means and controlled by said timing mechanism to stop said heater and terminate said toasting interval, and thermostatic mechanism cooperating with said timing mechanism to set the latter after an initial period of said toasting interval of predetermined duration to determine the duration of the subsequent period of said toasting interval, said means for starting the toasting interval including an operator manually movable in one direction to start the interval and automatically movable in the other direction under control of said timing mechanism, and said timing mechanism including a tripper to cause operation of said means for terminating the toasting interval, and there being an operative connection between said tripper and said thermostatic mechanism whereby the latter will set the former, and a detent cooperating with said tripper and normally influenced to hold said tripper against movement, said detent being formed to cooperate with said operator so that the detent is actuated by said operator as the latter is moved to start the interval so as to release and permit free movement of the tripper for a period after the beginning of the toasting interval and to hold the tripper against movement during the remainder of the toasting interval.

9. Apparatus of the character described comprising a toasting chamber, a constant speed timing mechanism, means for starting a toasting interval and said timing mechanism simultaneously, means cooperating with said starting means and controlled by said timing mechanism for terminating the toasting interval, and thermostatic mechanism cooperating with said timing mechanism to set the latter after an initial period of said toasting interval of predetermined duration to fix the duration of the remainder of said toasting interval, said timing mechanism including a tripper to cause operation of said means for terminating the toasting interval, there being an operative connection between said tripper and said thermostatic means whereby the latter will set the former, a device normally influenced to hold said tripper against movement, and means to actuate said device to release and to permit the tripper freely to move under influence of said thermostatic mechanism for an initial period after the beginning of the toasting interval and to permit said device to hold said tripper against further movement by the thermostatic mechanism during the remainder of the toasting interval.

10. Apparatus of the character described comprising a toasting chamber and a heater therefor, means for moving a slice into said chamber to start a toasting interval, a constant speed timing mechanism, means cooperating with the first-mentioned means and controlled by said timing mechanism for moving said slice out of said chamber to terminate said toasting interval, and thermostatic mechanism cooperating with said timing mechanism to set the latter after an initial period of said toasting interval of predetermined duration to determine the duration of the subsequent period of said toasting interval, said timing mechanism including a tripper to cause operation of said means for terminating the toasting interval, there being an operative connection between said tripper and said thermostatic means whereby the latter will set the former, a device normally influenced to hold said tripper against movement, and means to actuate said device to release and to permit the tripper freely to move under the influence of said thermostatic mechanism for an initial period after the beginning of the toasting interval and to permit said device to hold said tripper against further movement by the thermostatic mechanism during the remainder of the toasting interval.

11. Apparatus for the character described comprising a toasting chamber and a heater therefor, means for starting said heater to begin a toasting interval, a constant speed timing mechanism, means cooperating with the first-mentioned means and controlled by said timing mechanism to stop said heater and terminate said toasting interval, and thermostatic mechanism cooperating with said timing mechanism to set the latter after an initial period of said toasting interval of predetermined duration to determine the duration of the subsequent period of said toasting interval, said timing mechanism including a tripper to cause operation of said means for terminating the toasting interval, there being an operative connection between said tripper and said thermostatic means whereby the latter will set the former, a device normally influenced to hold said tripper against movement, and means to actuate said device to release and to permit the tripper freely to move under influence of said thermostatic mechanism for an initial period after the beginning of the toasting interval and to permit said device to hold said tripper against further movement by the thermostatic mechanism during the remainder of the toasting interval.

12. Apparatus of the character described comprising a toasting chamber, a constant speed timing mechanism, means for starting a toasting interval and said timing mechanism simultaneously, means cooperating with said starting means and controlled by said timing mechanism for terminating the toasting interval, and thermostatic mechanism cooperating with said timing mechanism to set the latter after an initial period of said toasting interval of predetermined duration to fix the duration of the remainder of said toasting interval, said means for starting the toasting interval including a part movable manually in one direction to start the interval and movable automatically under control of said timing mechanism in the other direction, said timing mechanism including a tripper to cause operation of said means for terminating the toasting interval, there being an operative connection between said tripper and said thermostatic means whereby the latter will set the former, and a device normally influenced to hold said tripper against movement, said part actuating said device to release and permit the tripper freely to move under the influence of said thermostatic mechanism for an initial period after the beginning of the toasting interval and to permit said device to hold said tripper against further movement by the thermostatic mechanism during the remainder of the toasting interval.

13. Apparatus of the character described comprising a toasting chamber and a heater therefor, means for moving a slice into said chamber to start a toasting interval, a constant speed timing mechanism, means cooperating with the first-mentioned means and controlled by said timing mechanism for moving said slice out of said chamber to terminate said toasting interval, and thermostatic mechanism cooperating with said timing mechanism to set the latter after an initial period of said toasting interval of predetermined duration to determine the duration of the subsequent period of said toasting interval, said means for starting the toasting interval including a part movable manually in one direction to start the interval and movable automatically under control of said timing mechanism in the other direction, said timing mechanism including a tripper to cause operation of said means for terminating the toasting interval, an operative connection between said tripper and said thermostatic means whereby the latter will set the former, a device normally influenced to hold said tripper against movement, and means including said part to actuate said device to release and permit the tripper freely to move under influence of said thermostatic mechanism for an initial period after the beginning of the toasting interval and to permit said device to hold said tripper against further movement by the thermostatic mechanism during the remainder of the toasting interval.

14. Apparatus of the character described comprising a toasting chamber and a heater therefor, means for starting said heater to begin a toasting interval, a constant speed timing mechanism, means cooperating with the first-mentioned means and controlled by said timing mechanism to stop said heater and terminate said toasting interval, and thermostatic mechanism cooperating with said timing mechanism to set the latter after an initial period of said toasting interval of predetermined duration to determine the duration of the subsequent period of said toasting interval, said means for starting the toasting interval including a part movable manually in one direction to start the interval and movable automatically under control of said timing mechanism in the other direction, said timing mechanism including a tripper to cause operation of said means for terminating the toasting interval, an operative connection between said tripper and said thermostatic means whereby the latter will set the former, and a device normally influenced to hold said tripper against movement, said part cooperating with said device to release and permit the tripper freely to move under influence of said thermostatic mechanism for an initial period after the beginning of the toasting interval and to permit said device to hold said tripper against further movement by the thermostatic mechanism during the remainder of the toasting interval.

MAURICE L. WARNER.